Figure 1:
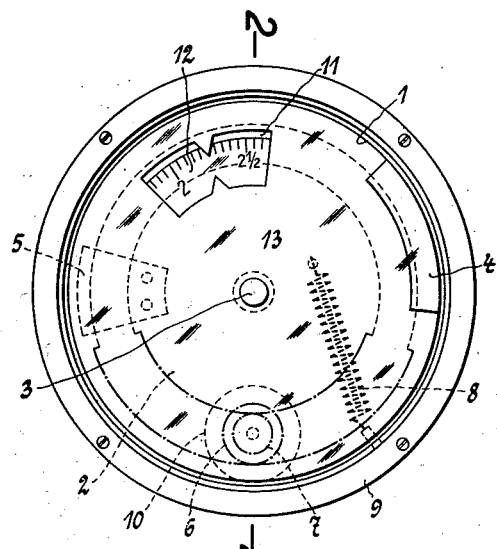

Sept. 3, 1929.  W. KLEMPERER  1,727,310
LOAD FACTOR INDICATOR FOR AIRCRAFT
Filed Aug. 29, 1921

Inventor:
Wolfgang Klemperer

Patented Sept. 3, 1929.

1,727,310

UNITED STATES PATENT OFFICE.

WOLFGANG KLEMPERER, OF AKRON, OHIO.

LOAD-FACTOR INDICATOR FOR AIRCRAFT.

Application filed August 29, 1921, Serial No. 496,732, and in Austria June 3, 1918.

The stress analysis of airplane wings and structures is—as a rule—based on the actual full weight to be lifted, a certain margin of safety being secured by designing the structures so as to stand a definite multiple of the "normal load". In the case of straight level flight only, this multiple or strength factor is identical with the factor of safety.

In curves and stunts, however, the wings have to carry not only the weight but also the forces of inertia which act upon the masses of the craft when it curves either horizontally or vertically or both at the same time. As the airplane is free to move in space, the force of inertia, as a vector, may form any angle from 0° to 360° with gravity. Therefore, there is no algebraic connection between the resultant of the two and the true acceleration alone. But is is this resultant which is to be borne by the wings and determines the actual load of the wings, and thereby the actually remaining factor of safety. The resultant of weight and inertia is often larger than either one alone, especially in taking out of a dive and in a steep lateral turn or turn combined with prancing. The actual safety factor during such a manoeuvre is much smaller than the initial strength factor of the design.

It is therefore, of vital importance for the pilot of an aircraft to know and during flight to survey the actual load factor as it changes and fluctuates in various manoeuvres and stunts and in gusts. Many airplanes have already been broken in mid-air by subjecting them deliberately but without means of checking them, to high load factors which happened to exceed that the airplane was built for.

This invention concerns an instrument which indicates the load factor of the airplane during flight. This instrument applies the principle of a system of masses controlled by a system of springs, while oscillations are damped. The fixed end of the spring system is mounted on the airplane in the neighborhood of the center of gravity of the latter. The system of masses is so adapted that its own center of gravity may move in a direction substantially perpendicular to the wing of the airplane, such movement however straining the system of springs.

As the instrument is sufficiently close to the center of gravity of the airplane, the play of the gravitational and centrifugal forces upon the instrument mass is perfectly proportional to that of the entire airplane. In the airplane, these two forces are exactly balanced by the lift force, in the instrument they are balanced by the tension of the deflected spring. Therefore, the tension of the spring is always proportional to the lift force exerted by the air upon the wings.

The aerodynamic force which the air exerts upon a wing depends upon the air density, the speed, the presentation of the wing to the air stream, i. e. the angles of attack and yaw. As, however, the wing is a substantially flat body the main component of the air pressure on it will in general be perpendicular to its plane. The load component perpendicular to the wing is therefore of primary importance. The wing load indicator would measure the vectorial wing force if the mass system is suspended as an elastic like a thread pendulum, i. e. if it could swing freely in space about the point of suspension. It measures the component perpendicular to the wing only, if the motion of the mass system is so confined that its center of gravity cannot but move in a line perpendicular to the wing.

Theoretically, such confining could be materialized by some guides along which the mass system is to slide. Practically, however, friction interferes and also resonance vibration is to be avoided by damping.

In order to overcome friction the mass is best arranged rotatable about an eccentric pivot like a horizontal pendulum. But the center of gravity then swings on an arc and as soon as some deflection is attained any lateral component of the force would disturb it. In order to compensate for this, the system is divided into two horizontal pendula of equal but opposite mass moment and so connected together that they cannot but deflect about equal but opposite angles. By placing the two oppositely rotatable members adjacent to one another and providing the one with a hand and the other with a graduation, the accurateness of the indication is doubled with respect to the size of the instrument.

In the accompanying drawing—

Figure 2:
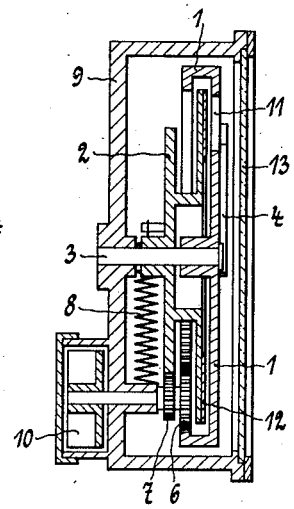

Figure 1 is a front view of the instrument, as seen by the pilot; Figure 2 is a vertical section on the line 2—2 of Figure 1. Similar numerals refer to similar parts throughout the several views.

The mass system consists of two eccentrically loaded discs, one 1 loaded by the weight 4 and the other 2 by the weight 5. Both are rotatable on the common pivot 3 and geared together by meshing with a pinion 6—7, the disc 1 meshing internally, disc 2 externally. So their sense of rotation is always opposite, their angular deflection, however, equal, the gearing being suitably designed. The weight 4 may look as tho placed a little too high; but this displacement is just to compensate for the lack of weight caused in the disc 1 by the window 11 cut therein and showing a part of the graduation 12 fastened on disc 2. A spring 8 controls the movement of the system of discs, its one end being attached to disc 2 and its other end to the case 9 of the instrument. A wind vane 10 is fastened to the axle of the pinion 6—7 in order to dampen oscillation of the system.

The device acts in the following manner. In straight flight the two discs are held by the spring in a certain stationary position, the weight of the pendula causing a certain "normal" strain of the spring. By any change of the perpendicular-to-the-wing component of gravity due to pitching or rolling of the craft, or to any such component of an inertia force as in an ascending or descending acceleration or in a banked turn the discs assume different positions of equilibrium straining the spring more or less. The deflection is being read at the graduation which is graduated in multiples of "normal" load.

I claim:

On an airplane, two substantially horizontal pendula in the form of eccentrically loaded disks mounted rotatably and coaxially adjacent to one another on an axis which is parallel to the plane of the wings of the airplane, one disk being provided with a hand, the other disk being provided with a graduation along which said hand is adapted to move when disks are being deflected; two pinions, one meshing with each disk, said pinions having a common spindle which spindle is provided with means for damping oscillations; said disks being of equal but opposite mass moment and the gearing between pinion and disks being so adapted as to cause the disks to deflect by equal angles under the combined action of gravity and inertia; and a spring holding said pendula substantially lateral and controlling their deflections from a point fixed in the airplane near the center of gravity of the latter.

WOLFGANG KLEMPERER.